Figure 1:
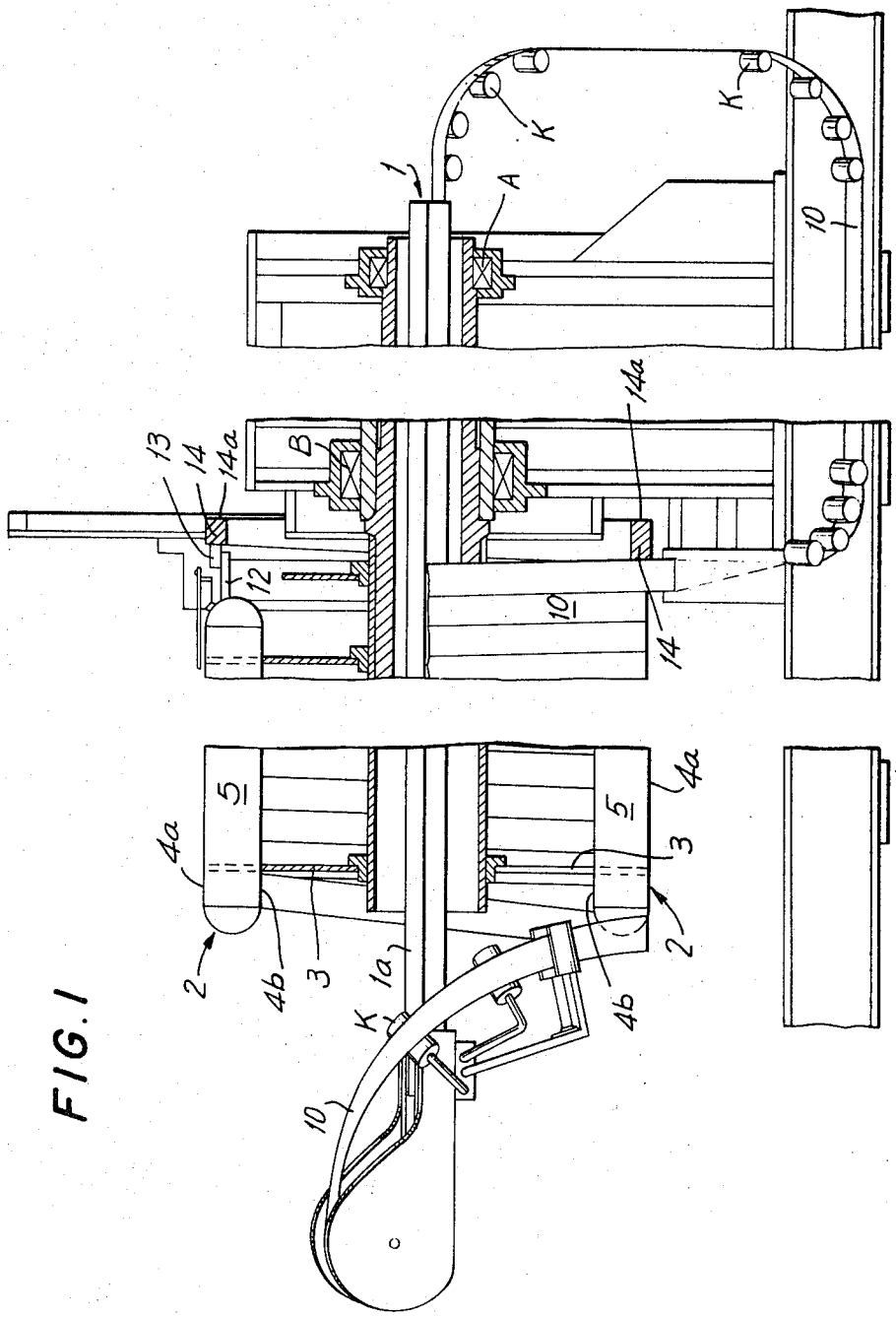

United States Patent
Poulsen

[15] 3,655,489
[45] Apr. 11, 1972

[54] WINDING AND FEEDING MANDREL FOR FORMING TUBING FROM STRIP MATERIAL

[72] Inventor: Peder Ulrik Poulsen, Lonholt Ladegard, 3480 Fredensborg, Lyngby, Denmark

[22] Filed: May 14, 1969

[21] Appl. No.: 824,576

[30] Foreign Application Priority Data

May 14, 1968 Denmark..............................2231/68

[52] U.S. Cl..............................................156/429, 156/446
[51] Int. Cl.................................................B65h 81/00
[58] Field of Search..............242/1; 156/425, 429, 443, 446, 156/433, 195, 184; 18/45

[56] References Cited

UNITED STATES PATENTS

| | | | |
|---|---|---|---|
| 2,845,109 | 7/1958 | Schneider | 156/429 |
| 3,155,559 | 11/1964 | Hall | 156/195 |
| 3,367,817 | 2/1968 | Bluck | 156/446 |
| 3,464,879 | 9/1969 | Poulsen | 156/425 |

FOREIGN PATENTS OR APPLICATIONS 1,348,141  11/1963  France..................................156/429

Primary Examiner—Billy S. Taylor
Attorney—Waters, Roditi, Schwartz & Nissen

[57] ABSTRACT

An apparatus for helically winding a strip forming the revolving surface of a winding mandrel at a pitch corresponding to the strip width, including a plurality of strip supports distributed about the winding axis of the mandrel, extending parallel thereto, spaced equally therefrom and adapted to rotate about the axis, and a stationary strip guide ring mounted concentrically with the convolutions.

2 Claims, 4 Drawing Figures

WINDING AND FEEDING MANDREL FOR FORMING TUBING FROM STRIP MATERIAL

This invention relates to an apparatus for helical winding of a strip forming the revolving surface of a winding mandrel at a pitch corresponding to the strip width, comprising a plurality of strip support means distributed around the winding axis, extending parallel thereto and spaced equally therefrom and adapted to rotate about that axis, and a stationary strip guide ring mounted concentrically with the strip convolutions. Such a winding apparatus as described in U.S. Pat. No. 3,464,879 is used particularly as a component member of a system for continuous production of tubing, for instance plastic tubing, in running lengths on a so-called winding mandrel, i.e. a driven mandrel rotatable about its longitudinal axis and with a tubular mandrel core having a core section extending free of the bearing means of the mandrel and an outer mandrel wall surrounding and spaced from the free mandrel core section. The outer mandrel wall is formed by the above mentioned wound strip, which is preferably an endless steel strip with mirror finish. During the production of the tubing the endless strip is wound continuously on to the strip support means in a direction towards the free end of the mandrel core. The strip support means are secured to the mandrel core and rotate with the core. The endless strip is guided by means of guide rollers to the point where the winding starts and is led from the free end of the mandrel over reversing rollers back through the hollow mandrel core to be led by other guide rollers back to the point where the winding starts. The tubing is formed on the outer surface of the wound strip member by applying thereto a suitable curable tube material in fluid or semi-fluid state.

In winding apparatus of this type the guide means in the region adjacent to the point where the winding on to the support means is started carry the strip obliquely towards the support means in a manner by which the rear edge of the strip facing away from the free end of the mandrel is caused to slide along the front guiding surface of the stationary guide ring which is concentric with the mandrel. The guiding surface has a pitch corresponding to the desired pitch of the strip convolutions. The guide ring thus causes the first strip convolution to be laid on to the support means at a pitch corresponding exactly to the strip width. In this way the strip convolutions will be disposed on the support means in edge to edge relationship to form a mandrel wall with the unbroken, smooth outer surface necessary for producing the tubing.

In the known strip winding apparatus the first convolution thus moves with a sliding friction on the guiding surface of the guide ring. Practical experiences have shown that this rapidly results in wear to the guiding surface of the guide ring, in that the rear edge of each first strip convolution will gradually cut into the said guiding surface to cause wear tracks and wear grooves. In the known strip winding apparatus the guide ring must therefore be replaced fairly often because a guide ring with wear grooves would no longer be able to ensure that the first strip convolution and thereby all the following convolutions are being wound at a constant pitch corresponding to the strip width.

It is the aim of the present invention to overcome this drawback, i.e. to provide an apparatus of the said type in which the stationary guide ring is not exposed to wear and tear caused by friction between the guide ring and the rear edge of the first convolution wound on to the mandrel. This has been accomplished by providing in the region where the winding of the strip on to the support means commences slides which are reciprocatable in the longitudinal direction of the support means and disposed radially inwardly of the strip convolutions, each slide having a rigidly mounted, radially outwardly extending thrust member for engagement with the rear edge of the first strip convolution and behind the thrust member a follower roller cooperating with the stationary guide ring disposed behind the follower roller and having a pitch corresponding to the pitch of the strip convolutions, and by providing for each slide a force, for instance the action of a spring, urging the slide towards the guide ring.

By means of the slide interposed between the first strip convolution and the stationary guide ring it is ensured that the rear edge of the strip during the forming of the first convolution is in motionless and frictionless engagement with the thrust member, and the correct pitch of winding has been achieved by the cooperation between the follower roller and the stationary guide ring. The roller runs frictionless on the front guiding surface of the guide ring so that the wear to the follower roller and the guide ring will be reduced to a minimum.

By forming the guide ring with a pitch which over a short length, approximately from the point where the winding of the strip starts, is slightly greater than the pitch of the strip, then converges with the strip pitch and at the last length proceeds rearwardly to the starting point, it is ensured that the thrust member from the point where the winding starts is brought rapidly, but without appreciable impact into engagement with the rear edge of the strip and then follows the helical rotatory movement of the strip at the desired pitch.

Figure 2:
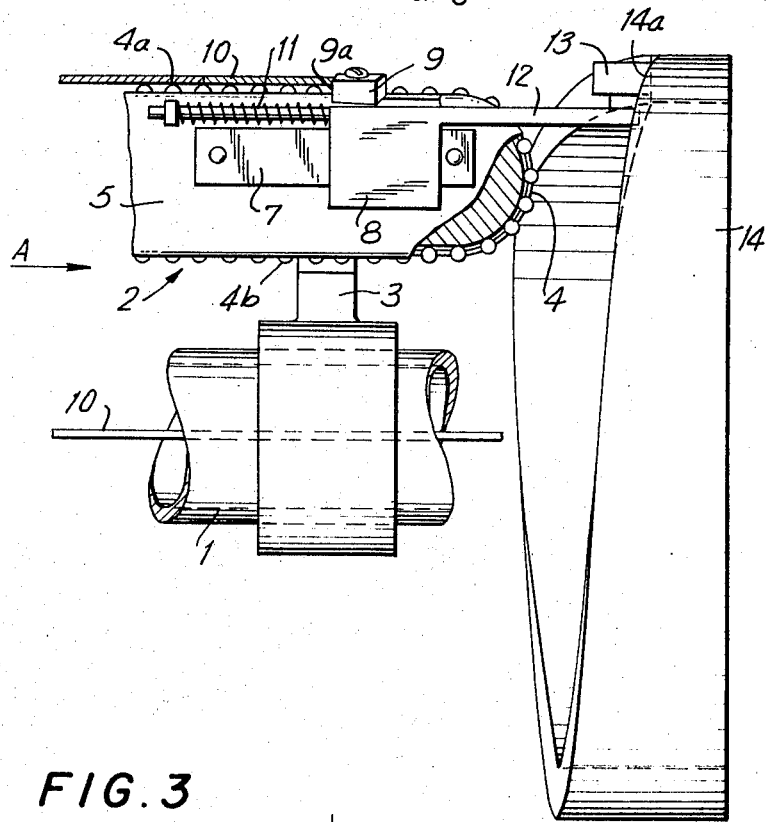
Figure 3:
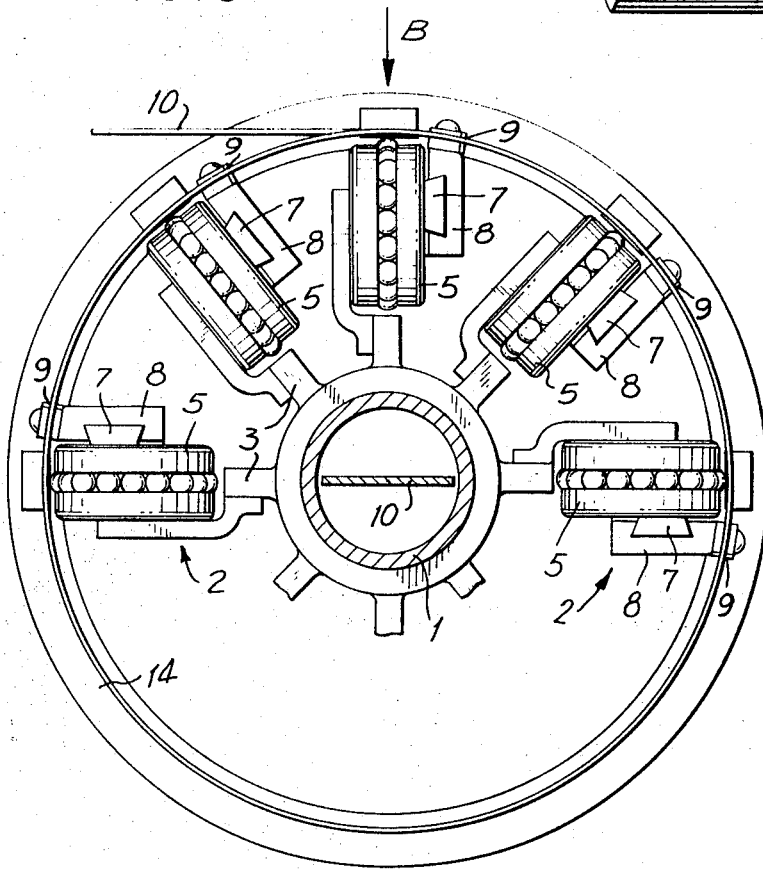
Figure 4:
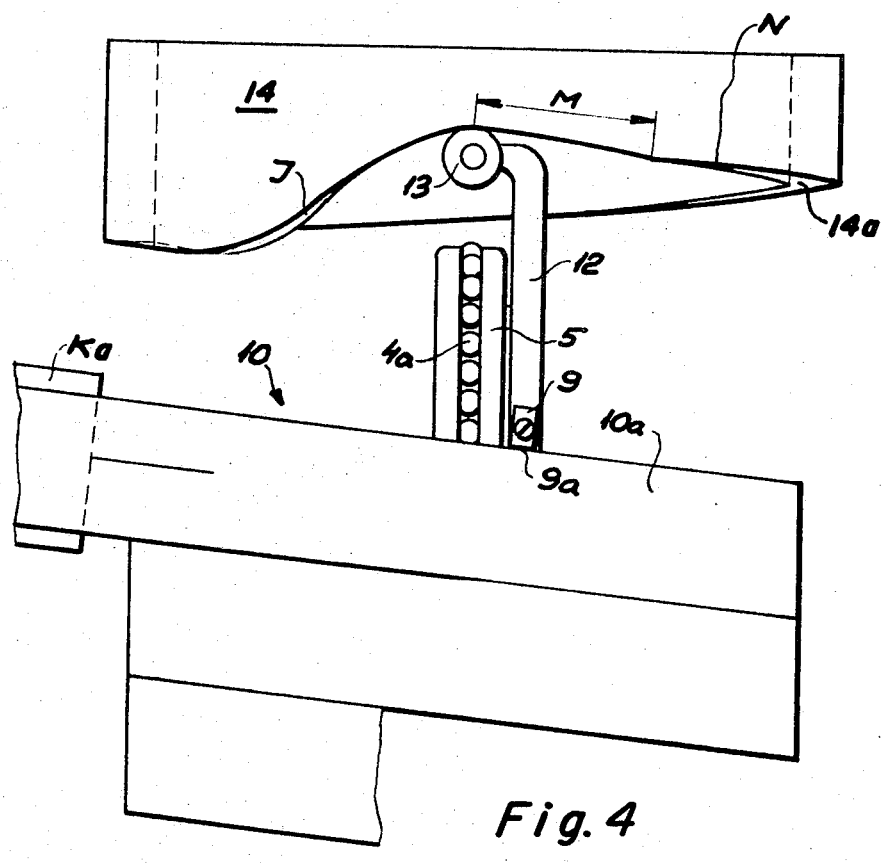

The invention will be described below in greater detail and with reference to the drawing, in which FIG. 1 shows schematically a vertical section of an embodiment of the apparatus according to the invention, FIG. 2 is a section of the apparatus on a larger scale and viewed in side elevation, FIG. 3 the same viewed in the direction of the arrow A in FIG. 2, and FIG. 4 the same viewed in the direction of the arrow B in FIG. 2.

FIG. 1 illustrates a section of a so-called winding mandrel comprising at its right hand end bearing means A and B for a tubular mandrel core 1 having a core section 1a extending free of the bearing means. On the core section 1 are mounted a plurality of strip support members 2, cf. also FIG. 2 and 3, distributed around this core section and extending parallel to the core. The mandrel is rotatable about its longitudinal axis and driven by drive means not shown here. The strip support means are spaced equally from the mandrel core section 1a and secured thereto by means of connecting members 3. Thus the strip support means are circulated around the longitudinal axis of the mandrel during the rotation of the mandrel core. Each of the support means comprises an endless ball belt 4 mounted on a ball belt holder 5 secured to the connecting member 3 and having a guiding path for the ball belt. The guiding path has two rectilinear path section extending parallel to the axis of the mandrel core 1: a radially outer section and a corresponding inner path section. These two path sections are interconnected at their ends by semi-circular path sections. The radially inner path section supports an inner ball belt section 4b while the radially outer path section supports an outer ball belt section 4a on which an endless strip 10, preferably a mirror-finish steel strip, which is to form the outer mandrel wall, is wound helically at a pitch corresponding to the strip width. On each ball belt holder 5 is mounted a slide 8 (only shown in FIG. 2 and 3) reciprocatable on a dovetailed guide 7 on the holder 5 in the longitudinal direction of the mandrel and situated radially inwardly of the ball belt section 4a, said slide being provided with a thrust member 9 extending radially outwardly of the ball belt section 4a and having a front contact face 9a for the rear edge of the first convolution 10a, FIG. 3, of the steel strip lo which is wound continuously and helically on to the outer ball sections 4a at a pitch corresponding to the strip width, as indicated in FIG. 3. The slide 8 is actuated by a spiral compression spring 11, one end of which is secured to the ball belt holder 5 and the other end of which engages the slide 8. The spring 11 is located to urge the slide towards right in FIGS. 1 and 2.

The slide 8, moreover, has an arm 12 extending axially towards right in FIGS. 1 and 2 on the free end of which is mounted a follower roller 13 which is freely rotatable about an axis perpendicular to and passing through the mandrel axis. The roller engages by its periphery a guiding surface 14a of a stationary guide ring 14 located to the right of the guide reel in FIGS. 1 and 2, and concentric with the axis of rotation of the mandrel. The guiding surface 14a extends over 360° and has, from approximately the point where the winding of the steel strip on the support means formed by the ball belts starts, over a short surface section M, FIG. 4, a pitch which is slightly greater than the pitch corresponding to the strip width at which the strip is to be wound. Adjacent to this short, relatively steep surface section the guiding surface 14a has a section N with a pitch corresponding to the pitch of the steel strip convolutions. The guiding surface section N extends almost to the point where the section M with the short, steep pitch starts. Between the rear end of the surface section N and the surface section M the guiding surface 14a has a section J extending to the right in FIG. 2 and then continuing into the surface section M.

The endless steel strip 10, is wound on to the ball belts of the mandrel starting from the base of the mandrel core section 1a and working towards its free end, i.e. from the right to the left in FIG. 2. From the free end of the mandrel i.e. from the last convolution of the strip on the mandrel, the endless steel strip is carried in a manner known per se and as disclosed in U.S. Pat. No. 3,464,879, by means of reversing rollers K, FIG. 1, through the tubular mandrel core 1 back to the region opposite the slides 8 where the strip by means of the last guide roller K, FIG. 4, and in the manner indicated in FIG. 4, is led obliquely towards the mandrel in an angle corresponding to the desired strip pitch relatively to the axis of rotation of the mandrel. The point where the winding of the steel strip is commenced to form the first convolution on the mandrel flushes axially with the point of transition between the section J of the guiding surface 14a and its section M. As the winding of the strip 10 starts the guiding surface section M will thus displace the roller 13 and thereby the slide 8 and the thrust member 9 towards left in FIGS. 2 at an axial speed which is greater than the axial displacement of the strip 10 on the mandrel, so that the contact face 9a of the thrust member 9 at the end of the guiding surface section M is brought into engagement with the rear edge of the first strip convolution 10a. During the continued rotation of the slide 8 about the mandrel axis caused by the cooperation between the roller 13 and the guiding surface section N the contact face 9a will then be displaced axially at a speed corresponding exactly to the pitch by which the strip 10 is to be wound in order that the strip convolutions on the mandrel may be disposed in edge to edge relationship and thus form an unbroken smooth mandrel wall on the outer surface of which tubing in running lengths can be produced by the application in any known manner of a material in fluid or semifluid form. At the point where in peripheral direction the first convolution has been almost completed and which corresponds to the beginning of the guiding surface section J, the guiding surface 14a turns abruptly to permit the spring 11 to displace the slide 8 to its starting position at the far right hand side in FIGS. 1 and 2. Then the contact face 9a of the thrust member 9 is brought into engagement with the rear edge of the part of the strip 10 forming the next convolution on the mandrel, and so the process goes on.

In the winding apparatus according to the invention every sliding movement is avoided, and thereby any friction between the sharp edge of the strip and the contact face 9a is obviated so that the wear thereon has been reduced to a minimum.

What I claim is:

1. An apparatus for the helical winding of a strip material forming the revolving surface of a winding mandrel at a pitch corresponding to the strip width, comprising; a plurality of strip support means; means mounting the strip support means about the winding axis, said strip support means extending parallel thereto and spaced equally therefrom; means to rotate said strip support means about said axis; stationary strip guide ring means mounted concentrically with the strip convolutions; slide means positioned in proximity to where the winding of the strip extends onto the strip support means, said slide means being reciprocatable in the longitudinal direction of said strip support means on dovetailed guides attached to the strip support means and being disposed radially inwardly of the strip convolutions, each said slide means comprising a rigidly mounted, radially outwardly extending thrust member adapted to engage the rear edge of the first strip convolution; follower roller means trailing said thrust member, said follower roller means being adapted to cooperate with said stationary guide ring means, said guide ring means having a pitch corresponding to the pitch of the strip convolutions; and spring means adapted to urge each said slide means towards the guide ring means.

2. An apparatus as claimed in claim 1 wherein said guide ring means is formed with predetermined pitch, the pitch over a short length from approximately the point where the winding of the strip starts, being slightly larger than the pitch of the strip, the pitch of said ring means converges with the pitch of the strip until just short of initial winding of the strip, and extending at a constant pitch toward the strip winding starting point.

* * * * *